(12) United States Patent
Kuzar et al.

(10) Patent No.: US 7,900,799 B2
(45) Date of Patent: Mar. 8, 2011

(54) DISPENSER APPARATUS AND A DISPENSING SYSTEM FOR DISPENSING A LIQUID FROM A BOTTLE

(76) Inventors: Bartlomiej Maciej Kuzar, Brampton (CA); Thanh Cong Dang, Toronto (CA)

( * ) Notice: Subject to any disclaimer, the term of this patent is extended or adjusted under 35 U.S.C. 154(b) by 678 days.

(21) Appl. No.: 11/979,340

(22) Filed: Nov. 1, 2007

(65) Prior Publication Data
US 2009/0114675 A1 May 7, 2009

(51) Int. Cl.
*B67D 5/00* (2006.01)
(52) U.S. Cl. .......... 222/52; 222/40; 222/516; 251/129.2; 251/313
(58) Field of Classification Search ............ 222/40, 222/52, 23, 504, 516, 517, 548; 251/129.01, 251/129.2, 313
See application file for complete search history.

(56) References Cited

U.S. PATENT DOCUMENTS

| | | | | |
|---|---|---|---|---|
| 1,961,173 | A * | 6/1934 | Schutte et al. ............... | 222/516 |
| 4,278,186 | A * | 7/1981 | Williamson .................. | 222/36 |
| RE31,434 | E * | 11/1983 | Reilly ........................... | 222/25 |
| 4,436,223 | A * | 3/1984 | Wilson ......................... | 222/36 |
| 4,790,512 | A * | 12/1988 | Lindsay ...................... | 251/129.2 |
| 5,044,521 | A * | 9/1991 | Peckels ........................ | 222/23 |
| 5,255,819 | A * | 10/1993 | Peckels ........................ | 222/1 |
| 5,507,411 | A * | 4/1996 | Peckels ........................ | 222/1 |
| 5,816,448 | A * | 10/1998 | Kobold ........................ | 222/36 |
| 6,036,055 | A * | 3/2000 | Mogadam et al. ............ | 222/23 |
| 6,123,225 | A * | 9/2000 | Peckels ........................ | 222/1 |
| 6,409,046 | B1 * | 6/2002 | Peckels ........................ | 222/1 |
| 6,427,871 | B1 * | 8/2002 | Suero ........................... | 222/36 |
| 6,892,166 | B2 * | 5/2005 | Mogadam ..................... | 702/186 |
| 7,272,537 | B2 * | 9/2007 | Mogadam ..................... | 702/186 |
| 2002/0088823 | A1 * | 7/2002 | Tabacchi et al. .............. | 222/52 |
| 2004/0137140 | A1 * | 7/2004 | Childers ....................... | 427/2.1 |
| 2007/0181601 | A1 * | 8/2007 | Daly ............................. | 222/152 |
| 2008/0017664 | A1 * | 1/2008 | Haste et al. .................. | 222/40 |
| 2008/0052094 | A1 * | 2/2008 | Morfopoulos et al. ........ | 705/1 |

* cited by examiner

*Primary Examiner* — Kenneth Bomberg
*Assistant Examiner* — Donnell Long

(57) ABSTRACT

A dispenser apparatus and a dispenser system for dispensing a liquid from a bottle having a neck portion consisting of a housing formed with a flow conduit therethrough in fluid communication with the liquid within the bottle, the flow conduit having an inlet conduit, an outlet conduit and a substantially cylindrical cavity positioned between the inlet conduit and the outlet conduit, a flow wheel positioned in the cavity, the flow wheel having a central axis and a plurality of blade elements extending outwardly relative to the central axis, a flow sensor positioned adjacent to the flow wheel and the cavity for detecting movement of the plurality of blade elements of flow wheel, an electromagnetic valve positioned proximate to the outlet conduit, the electromagnetic valve having an actuation unit outside of the outlet conduit, a valve member inside the outlet conduit, and a spring member biased against the valve member within the outlet conduit, the valve member rotatable between a closed position and an open position upon the actuation of the actuation unit, and a microprocessor operatively connected to the flow sensor, the microprocessor programmed for actuating the actuation unit between the closed position and the open position and for measuring the volume of liquid flowing through the flow conduit via the flow wheel. The dispenser system further consisting of a remote computer unit for communicating a control signal to each of the plurality of dispenser apparatuses, the control signal controlling the volume of liquid to be dispensed from one or more of the plurality of bottles.

34 Claims, 11 Drawing Sheets

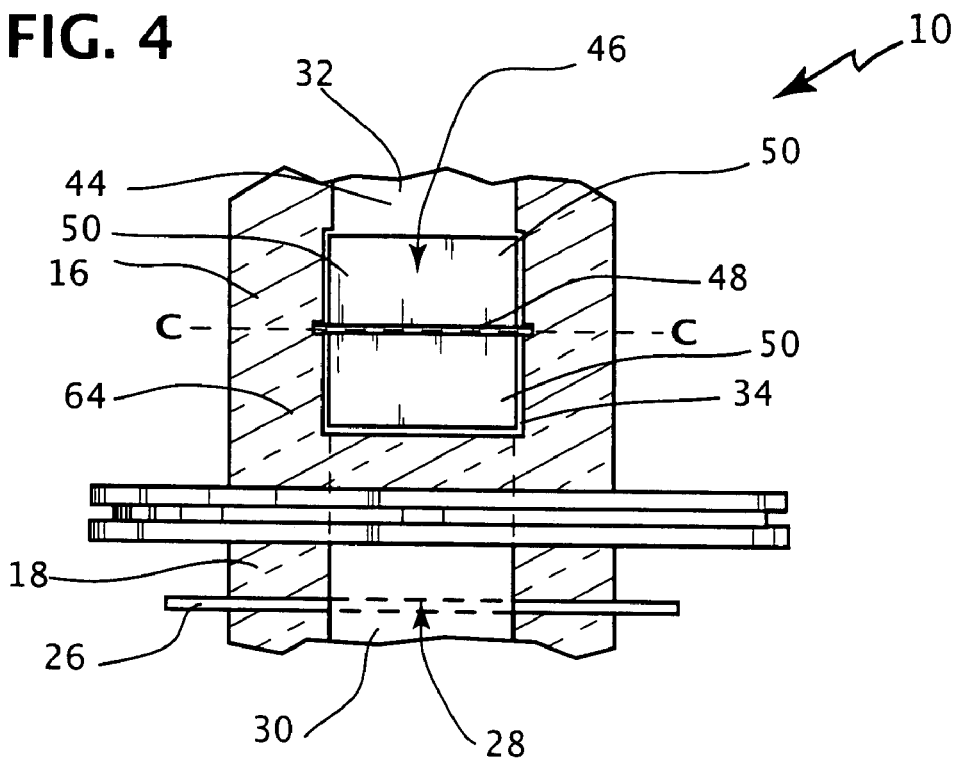
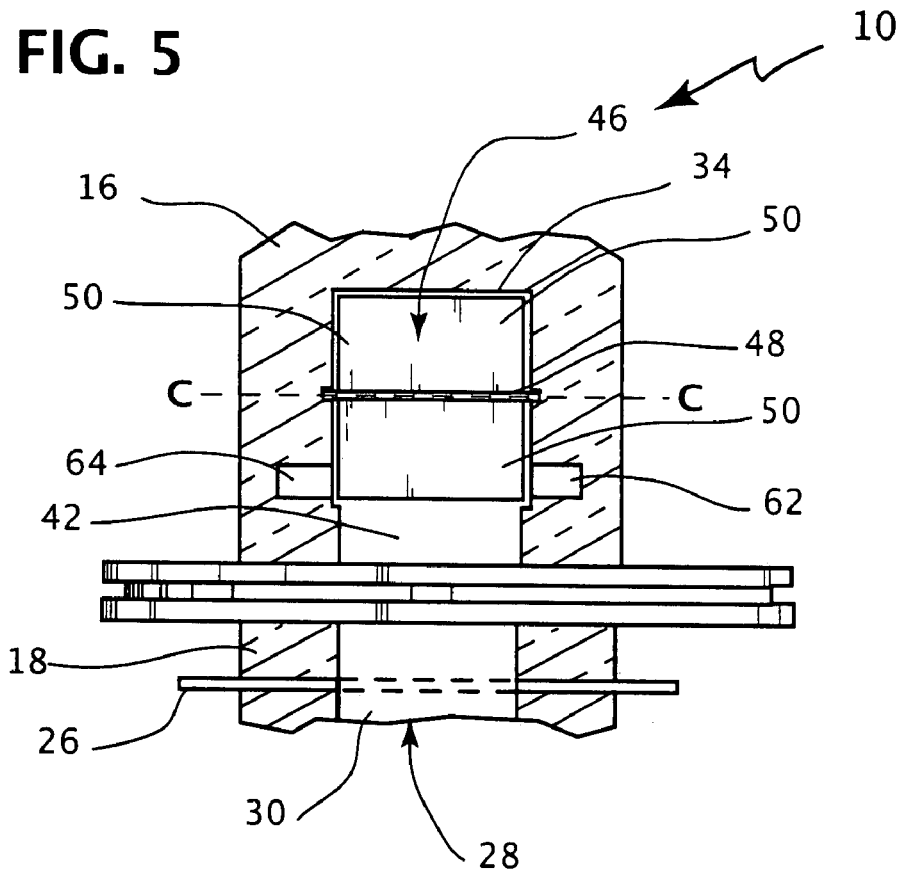

DISPENSER APPARATUS AND A DISPENSING SYSTEM FOR DISPENSING A LIQUID FROM A BOTTLE

FIELD OF THE INVENTION

The present invention relates to a dispenser apparatus and a dispenser system for dispensing a liquid from a bottle, and more particularly to a dispenser apparatus and a system having a flow wheel and flow sensor for dispensing a controlled amount of a liquid from a bottle.

BACKGROUND OF THE INVENTION

In many industries, the measurement and control of liquids dispensed during mixing processes is imperative to the usability and profitability of the resulting liquid mixture. In the chemical industry, the accurate measurement of liquids in a mixing process is vital to the safety and merchantability of the resulting liquid mixture. Similarly, in the restaurant and bar industry, the quality and taste of a mixed beverage depends largely upon the accurate measurement of the liquids combined during the mixing process. In addition to maintaining the quality and uniformity of the mixed beverages, restaurant and bar managers are also concerned with maintaining the profitability of their businesses by preventing the unauthorized dispensing of liquids, such as, liquors, beer, carbonated beverages and juices, by staff.

In recent years, a variety of dispensers have been developed or suggested for dispensing liquids. These prior art dispensers have been met with varying degrees of success, but have generally been unable to accurately measure and monitor the volume of the liquids dispensed during mixing processes. These prior art dispensers are also problematic because they can be easily manipulated by individuals to enable the continued unauthorized dispensing of liquids. For example, Mogadam U.S. Pat. No. 6,036,055 is a liquid dispensing method and apparatus having a loose ferrous valve, which is preferably a ball, that is maintained in an open position by a permanent magnetic means and released into a closed position by an electronic means. The valve or ball is caused to drop and close by the momentary canceling of the magnetic field from the magnetic means by the electronic means. This design is problematic since it can be easily manipulated by positioning an external magnetic adjacent to the dispensing apparatus (such as in the hand of an individual dispensing liquid from a bottle) to counter the momentary canceling of the magnetic field generated by the magnetic means as a result of the activation the electronic means.

Similar ball valve-type dispenser apparatuses shown in U.S. Pat. Nos. 4,278,186, 5,044,521, 5,505,349, 5,255,819, and 6,123,255 can also be manipulated in the aforementioned manner and, therefore, have met with varying degrees of success.

Prior art dispensers are also problematic because they are designed to dispense liquid in accordance with a time-based estimate of the volume of liquid flowing though the dispenser rather than by measuring the actual volume of liquid being dispensed. These prior art dispensers typically utilize a timer or timer circuit designed to activate and deactivate a valve over a pre-determined period of time. Williamson U.S. Pat. No. 4,278,186 discloses a wireless pour spout which incorporates a pour-control mechanism in the spout head. A ball bearing is held by an electromagnetic force for a period of time sufficiently long so that a predetermined amount of liquid can be poured through the spout. Once the pour period is completed, the electromagnetic member holding the ball bearing is de-energized and the ball bearing drops into the pour channel and stops the flow of the liquid. In addition to being susceptible to manipulation, these prior art dispensers are incapable of dispensing accurate and consistent volumes of liquids. Many factors, including the angle at which the bottle is held when dispensing the liquid and the temperature and viscosity of the liquid being dispensed, for example, could significantly affect the volume of liquid flowing through the dispensers over a pre-determined period of time. As a result, beverages prepared using these prior art dispensers can be inconsistent and potentially unsatisfying to patrons of the restaurant or bar.

Accordingly, there is a need for an improved dispenser which overcomes most, if not all, of the preceding problems. Moreover, there is a need for a flow wheel type dispenser that is capable of dispensing accurate and consistent volumes of liquids from a bottle.

SUMMARY OF THE INVENTION

In a first aspect, the invention is directed to a dispenser apparatus for dispensing a liquid from a bottle having neck portion. The dispenser apparatus includes a housing, a flow wheel, a flow sensor, an electromagnetic valve and a microprocessor. The housing is formed with a flow conduit therethrough in fluid communication with the liquid within the bottle, the flow conduit having an inlet conduit, an outlet conduit and a substantially cylindrical cavity positioned between the inlet conduit and the outlet conduit. The flow wheel is positioned in the cavity, the flow wheel having a central axis and a plurality of blade elements extending outwardly relative to the central axis. The flow sensor positioned adjacent to the flow wheel and the cavity for detecting movement of the plurality of blade elements of flow wheel. The electromagnetic valve is positioned proximate to the outlet conduit, the electromagnetic valve having an actuation unit outside of the outlet conduit and a valve member inside the outlet conduit, the valve member rotatable between a closed position and an open position upon the actuation of the actuation unit. The microprocessor is operatively connected to the flow sensor for measuring the volume of liquid flowing through the flow conduit via the flow wheel and for actuating the actuation unit between the closed position and the open position.

In a further aspect of the present invention, the dispenser apparatus may include a motion sensor switch operatively connected to the microprocessor for forming an electrical connection with a battery and supplying power to the microprocessor upon the detection of movement of the bottle. The motion sensor switch is positioned within the nozzle portion for detecting movement of the bottle, the motion sensor switch having a first contact plate, a second contact plate vertically spaced apart from the first contact plate, a contact ring disposed between the first contact plate and the second contact plate, and a ball bearing.

In a further aspect of the present invention, the base portion formed with an upper inlet chamber and a lower inlet chamber slidably coupled to the upper inlet chamber, each of the upper inlet chamber and the lower inlet chamber formed with one or more seals extending generally perpendicularly therefrom for substantially forming a seal between the base portion and the neck portion.

In a further aspect of the present invention, the upper inlet chamber and the lower inlet chamber are formed with a tamper switch, the tamper switch is operatively connected to the microprocessor and has a cylindrical ring electrode mounted within the lower inlet chamber and a conducting wire mounted within the upper inlet chamber, the cylindrical ring electrode and the conducting wire forming an electrical circuit. The tamper switch forms a closed electrical circuit when the lower inlet chamber is slidably positioned upwardly in relation to the upper inlet chamber within the neck portion of the bottle to bring the cylindrical ring electrode into electrical contact with the conducting wire.

In a further aspect of the present invention, the outlet conduit has a lower outlet chamber, an upper outlet chamber in fluid communication with the lower outlet chamber, and a valve seat positioned the lower outlet chamber and the upper outlet chamber, the valve member is urged by the spring member against the valve seat in the closed position, and the valve member is spaced apart from the valve seat in the open position. The rotatable movement of the valve member between the closed position and the open position prevents the flow of the liquid from the bottle through the conduit and the electromagnetic valve. In the closed position the liquid is prevented from flowing from the bottle through the upper conduit by the electromagnetic valve. In the open position the liquid is permitted to flow from the bottle through the upper conduit and the electromagnetic valve.

In a further aspect of the present invention, the actuation unit having a magnetic member and a coil of electrically conductive material wound around the magnetic member, the coil of electrically conductive material adapted for changing the polarity of the magnetic member when energized and de-energized by the actuation unit. The magnetic member having one or more poles adapted to impose a magnetic force on the valve member when energized by the actuation unit, the magnetic force imposed being sufficient to rotate the valve member from the closed position to the open position.

In a further aspect of the dispenser apparatus, the flow sensor can be positioned adjacent to the flow wheel for emitting a light beam to intersect the rotational path of the plurality of blade elements, the flow sensor having a light transmitter for emitting the light beam and a light receiver juxtaposed to the light transmitter for detecting the light beam from the light transmitter.

In a second aspect, the invention is directed to a dispenser system for dispensing a liquid from a plurality of bottles, each of the bottles having a neck portion. The dispenser system includes a plurality of dispensers, each of the plurality of dispensers having a housing, a flow wheel, a flow sensor, an electromagnetic valve, a microprocessor, and a remote computer unit. The housing is formed with a flow conduit therethrough in fluid communication with the liquid within the bottle, the flow conduit having an inlet conduit, an outlet conduit and a substantially cylindrical cavity positioned between the inlet conduit and the outlet conduit. The flow wheel positioned in the cavity, the flow wheel having a central axis and a plurality of blade elements extending outwardly relative to the central axis. The flow sensor positioned adjacent to the flow wheel and the cavity for detecting movement of the plurality of blade elements of flow wheel.

The electromagnetic valve positioned proximate to the outlet conduit, the electromagnetic valve having an actuation unit outside of the outlet conduit and a valve member inside the outlet conduit, the valve member rotatable between a closed position and an open position upon the actuation of the actuation unit. The microprocessor operatively connected to the flow sensor for measuring the volume of liquid flowing through the flow conduit via the flow wheel and for actuating the actuation unit between the closed position and the open position. The remote computer unit for communicating a control signal to each of the plurality of dispensers, the control signal controlling the volume of liquid to be dispensed from the plurality of bottles.

In a further aspect, the dispenser system may include one or more input devices for receiving and communicating beverage orders to the remote computer unit via a wireless communication network. The remote computer unit may be programmed to communicate one or more recipe and dispensing sequence instructions to one or more dispenser apparatuses upon receiving the beverage orders from the one or more input devices, wherein the one or more recipe and dispensing sequence instructions activating one or more light emitting diodes within one or more dispenser apparatuses for identifying the liquids for dispensing and mixing the beverage orders. The one or more recipe and dispensing sequence instructions identifying the one or more bottles and volumes of liquids to be dispensed and mixed for the beverage orders.

In a further aspect of the dispenser system, each of the plurality of dispenser apparatuses further comprising a motion sensor switch operatively connected to the microprocessor for forming an electrical connection with a battery and supplying power to the microprocessor upon the detection of movement of the bottle. Each of the plurality of dispenser apparatuses base portion formed with an upper inlet chamber and a lower inlet chamber slidably coupled to the upper inlet chamber, each of the upper inlet chamber and the lower inlet chamber formed with one or more seals extending generally perpendicularly therefrom for substantially forming a seal between the base portion and the neck portion.

In a further aspect of the dispenser system, the upper inlet chamber and the lower inlet chamber of each of the plurality of dispenser apparatuses may be formed with a tamper switch, the tamper switch is operatively connected to the microprocessor and the remote computer unit from communicating a tamper signal. The tamper switch forms a closed electrical circuit when the lower inlet chamber is slidably positioned upwardly in relation to the upper inlet chamber within the neck portion of the bottle to bring a cylindrical ring electrode within the lower inlet chamber into electrical contact with a conducting wire within the upper inlet chamber. Each of the tamper switches may be programmed to communicate a tamper signal to the microprocessor and the remote computer unit in the event of the unauthorized dispensing of liquid from one or more of the plurality of bottles. The remote control unit may be programmed to terminate the dispensing of liquid from the plurality of bottles upon the communication of a tamper signal.

In a further aspect of the dispenser system, each of the plurality of dispenser apparatuses further may be formed with an identification module for communicating with a transponder and the remote computer unit for determining and monitoring the identity of an individual dispensing liquid from the plurality of bottles. The transponder storing information for enabling the identification and monitoring of the individual by the remote computer unit.

BRIEF DESCRIPTION OF THE INVENTION

For a better understanding of the present invention, and to show more clearly how it may be carried into effect, reference will now be made, by way of example, to the accompanying drawings, in which:

FIG. 1 a perspective view of a dispenser apparatus for dispensing a liquid from a bottle having a neck portion made in accordance with an embodiment of the present invention;

FIG. 4 is a partial cross-sectional view of a cavity of the dispenser apparatus of FIG. 1 showing a flow sensor;

FIG. 5 is a schematic diagram of a microprocessor of the dispenser apparatus of FIG. 1;

DETAILED DESCRIPTION OF THE INVENTION

Figure 1:
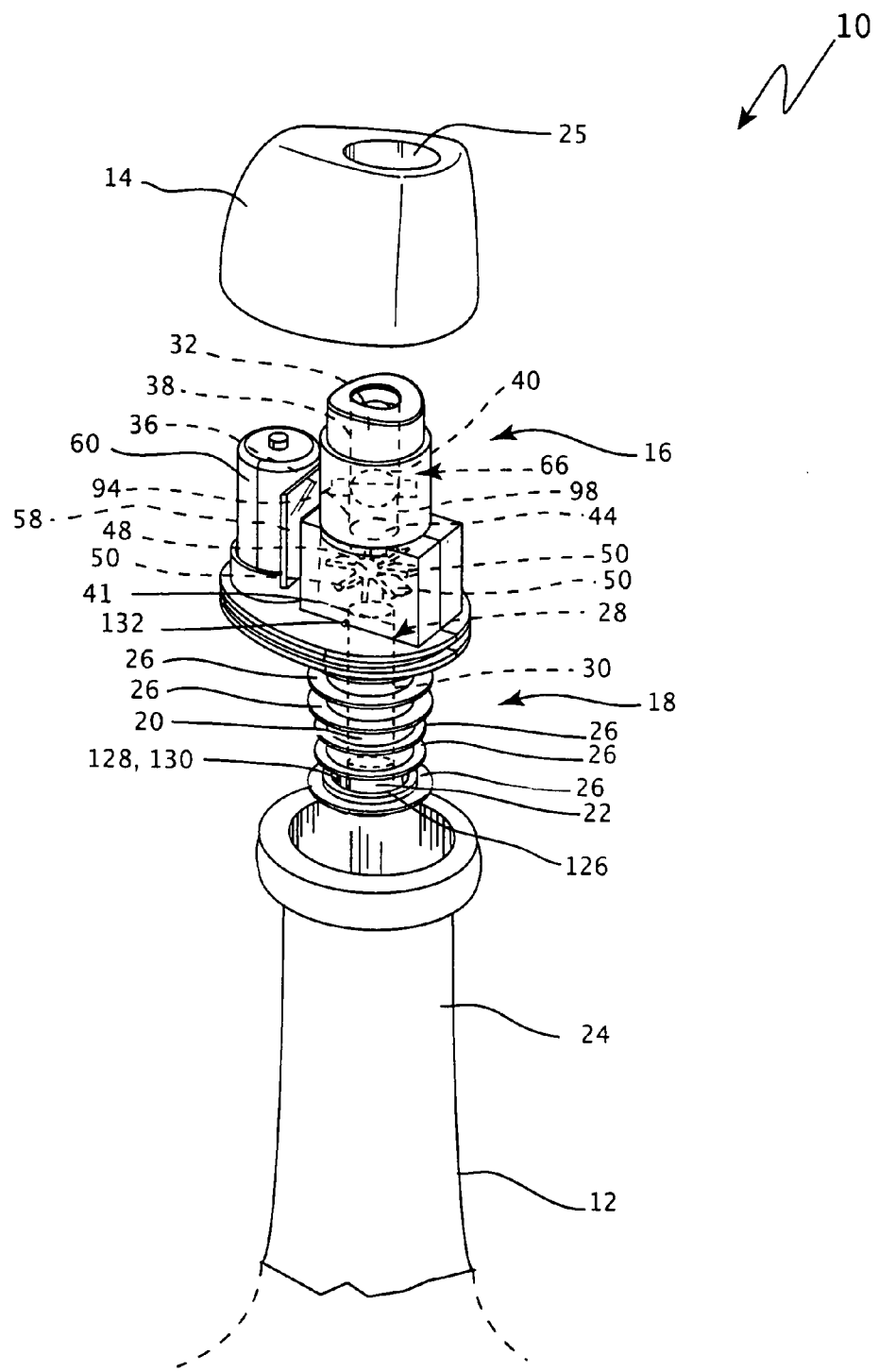
Figure 2:
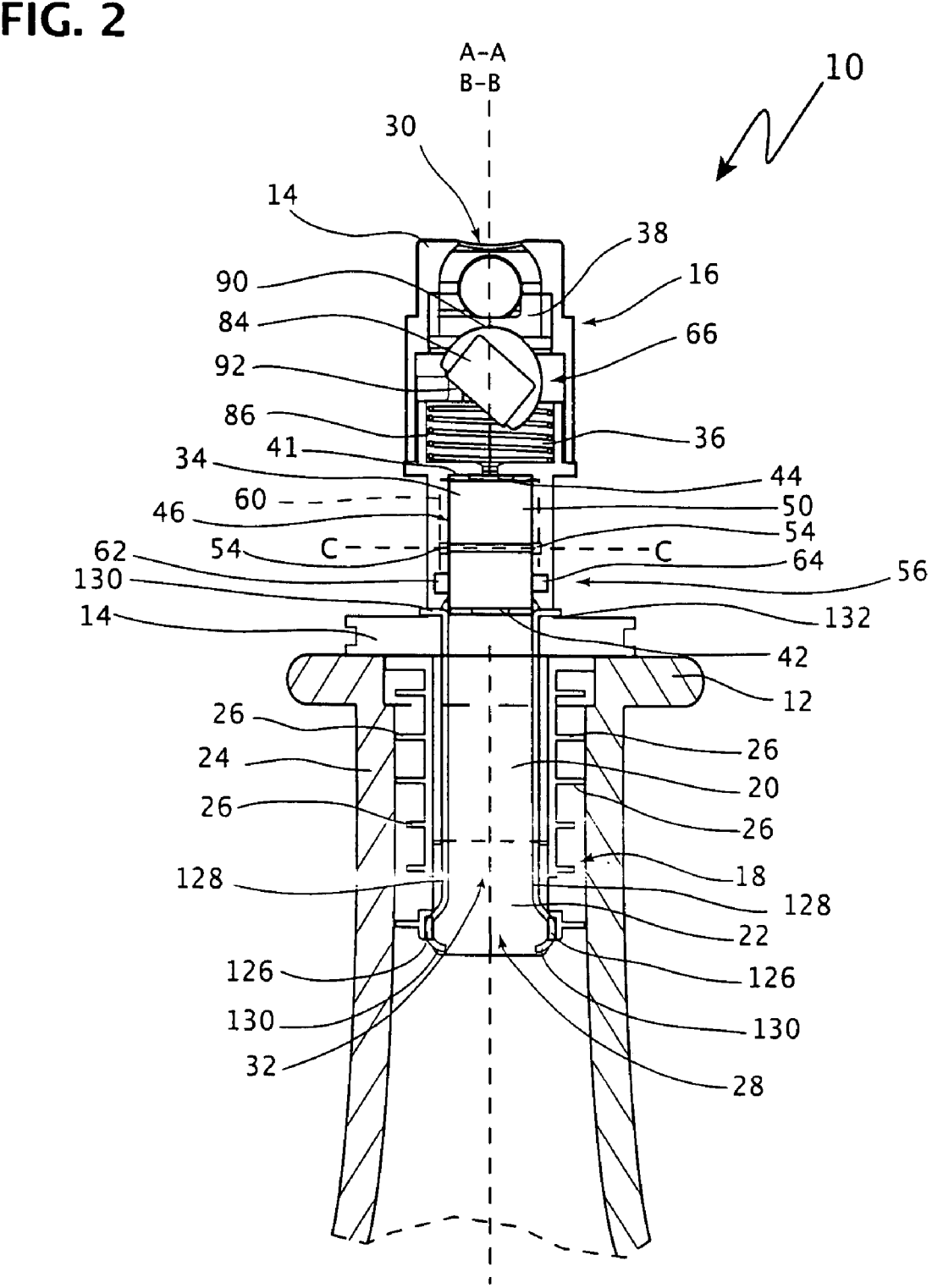
FIG. 2 is a partial cross-sectional view of the dispenser apparatus of FIG.1.
Figure 3:
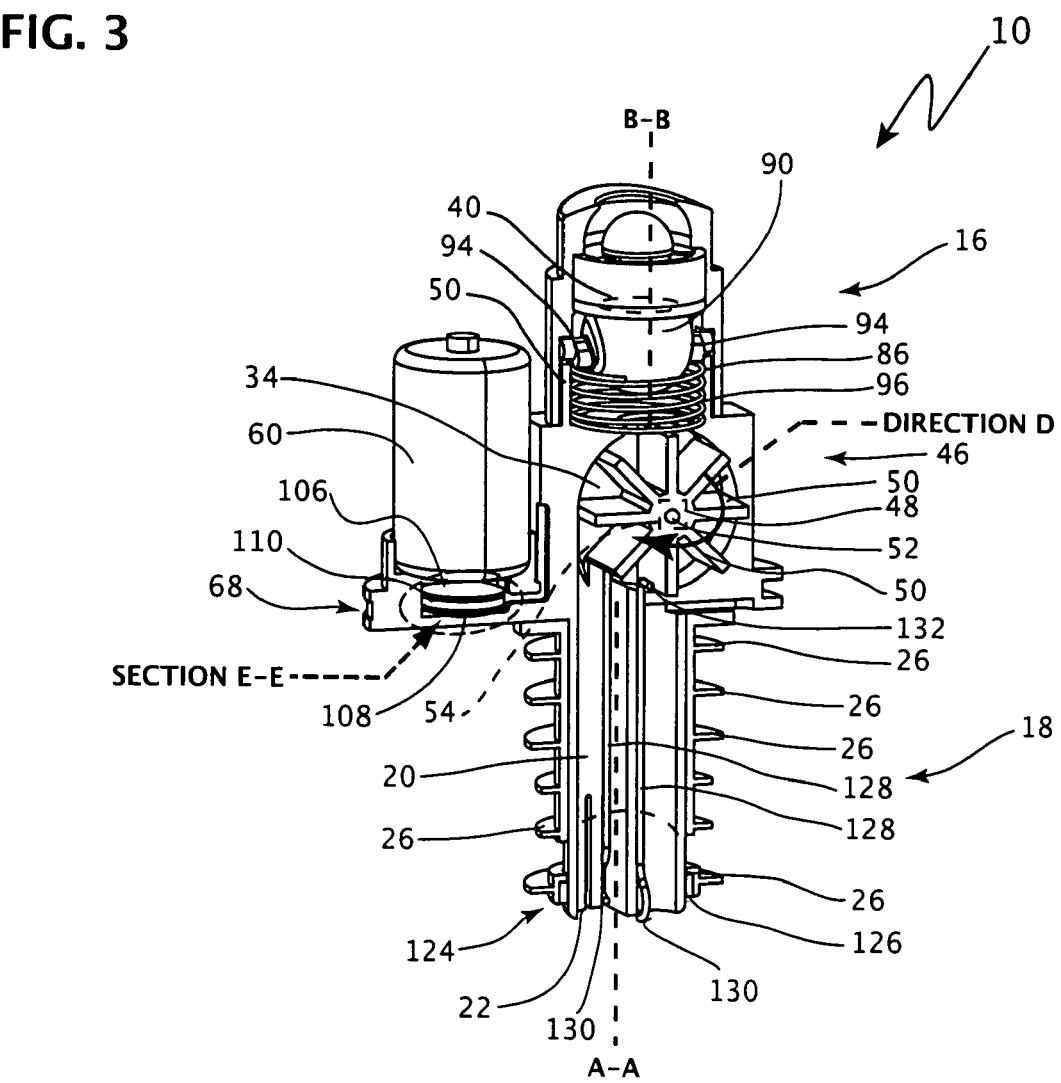
FIG. 3 is a partial cross-sectional view of the dispenser apparatus of FIG. 1 showing a flow wheel.

Reference is made to FIGS. 1-3 which illustrate a dispenser apparatus 10 for dispensing a liquid from a bottle 12 made in accordance with a preferred embodiment of the invention. The dispenser apparatus 10 includes a housing 14 releasably covering a nozzle portion 16 and a base portion 18 that are integrally formed together. The base portion 18 includes an upper inlet chamber 20 and a lower inlet chamber 22 slidably coupled to the upper inlet chamber 20. When coupled to the bottle 12, the dispenser apparatus 10 is positioned substantially vertically in relation to a neck portion 24 of the bottle 12, with the upper and lower inlet chambers 20 and 22 being substantially received within the neck portion 24 of the bottle 12 and the nozzle portion 16 extending from the neck portion 24. The nozzle portion 16 may be adapted to at least partially extend though a nozzle aperture 25 formed in the housing 14. The base portion 18 may be formed with one or more seals 26 extending generally perpendicularly from the upper and lower inlet chambers 20 and 22. The one or more seals 26 substantially forming a seal between the base portion 18 and the neck portion 24 when the dispenser apparatus 10 is received within the neck portion 24 of the bottle 12. The dispenser apparatus 10 is adapted to dispense a wide variety of liquids from the bottle 12, including, but not limited to, liquors, spirits, beer, water, juices and carbonated beverages.

Referring to FIGS. 1 and 2, the housing 14 is formed with a flow conduit 28 therethrough that is in fluid communication with the liquid within the bottle 12. The flow conduit 28 includes an inlet conduit 30, an outlet conduit 32 and a substantially cylindrical cavity 34 positioned between and in fluid communication with the inlet conduit 30 and the outlet conduit 32 within the housing 14. Each of the inlet and outlet conduits 30 and 32 have circular cross-sections. The outlet conduit 32 includes a lower chamber 36, an upper chamber 38 in fluid communication with the lower chamber 36, and a valve seat 40 positioned between the lower and upper chambers 36 and 38. The inlet conduit 30 has a longitudinal axis A-A that intersects with a circumferential edge 41 of the cavity 34 at a first aperture 42. The outlet conduit 32 has a longitudinal axis B-B that intersects with the circumferential edge 40 of the cavity 34 at a second aperture 44. As shown in FIG. 2, the longitudinal axis A-A is substantially parallel to and offset from the longitudinal axis B-B. By this design, the inlet conduit 30 receives liquid from within the bottle 12 and supplies the liquid to the cavity 34 through the first aperture 42. The liquid supplied to the cavity 34 then flows through the second aperture 44 into the outlet conduit 32 for dispensing from the nozzle portion 16 of the dispenser apparatus 10. It should be understood by persons skilled in the art of the present invention that the inlet conduit 30 and the outlet conduit 32 may be dimensioned to have any suitable diameter for promoting the flow of the liquid through the dispenser apparatus 10 and minimizing pressure losses.

Referring to FIGS. 3, 4 and 5, a flow wheel 46 is mounted within the cavity 34. The flow wheel 46 is formed with a central shaft 48 and a plurality of blade elements 50 extending outwardly into the cavity 34 from the central shaft 48. Each end of the central shaft 48 is formed with a point member 52 that is adapted to be seated within a bearing member 54 formed on each side of the cavity 34 for facilitating the rotational movement of the flow wheel 46 about a central axis C-C in response to liquid flowing into the cavity 34 from the inlet conduit 30. At least a portion of the blade elements 50 extend into the flow path of the liquid entering into the cavity 34 from the inlet conduit 30. When liquid is being dispensed from the dispenser apparatus 10, the liquid flows from the bottle 12 through the inlet conduit 30 and into the cavity 34. Within the cavity 34, the liquid contacts one or more of the plurality of blade elements 50 causing the flow wheel 46 to rotate in the direction of the rotational arrow D. The liquid is carried by the blade elements 50 of the flow wheel 46 through the cavity 34 and into the second aperture 44 of the outlet conduit 32. It should be understood by persons skilled in the art of the present invention that the blade elements 50 and the cavity 34 may have any suitable dimensions for handling any type of flow of liquid through the flow conduit 28, such as, laminar, turbulent, steady or non-steady flows, for example.

Referring to FIGS. 2 and 5, a flow sensor 56, a microprocessor 58 and a battery 60 are provided within the nozzle portion 16 of the housing 14. The flow sensor 56 is positioned adjacent to the flow wheel 46 and the cavity 34 for detecting movement of the plurality of blade elements 50 of flow wheel 46. In an exemplary embodiment of the flow sensor, the flow sensor 56 has a light transmitter 62 for emitting the light beam and a light receiver 64 juxtaposed to the light transmitter 62 for detecting the light beam from the light transmitter 62. When the flow wheel 46 rotates within the cavity 34 in response to the flow of liquid from the inlet conduit 30, one or more of the plurality of blade elements 50 interfere with the path of the light beam from the light transmitter 62 to the light receiver 64. The light receiver 64 detects that the light beam from the light transmitter 62 has become momentarily interfered by the movement of the blade element 50 and communicates a flow signal to the microprocessor 58. In alternative embodiments of the invention, the flow sensor 56 may be any suitable sensor for detecting the movement of the flow wheel 46, such as, for example, a photosensor, a laser sensor, an optical sensor, or a magnetic sensor.

The microprocessor 58 is operatively connected to the flow sensor 56, an electromagnetic valve 66 and a motion sensor switch 68 for controlling the dispensing of the liquid from the bottle 12 through the flow conduit 28. The microprocessor 58 is adapted to receive the flow signal communicated by the flow sensor 56. The flow signal provides information to the microprocessor 58 relating to the flow of liquid through the cavity 34, including the rotational movement and speed of the flow wheel 46. The microprocessor 58 is programmed to measure the volume of liquid flowing from the dispenser apparatus 10 based on the information communicated in the flow signal and stored information relating to the dimensions of the inlet conduit 30, the cavity 34, the flow wheel 46 and the outlet conduit 32. Upon measuring that the desired volume of liquid has been dispensed from the dispenser apparatus 10 via the flow conduit 28, the microprocessor 58 communicates a control signal to the electromagnetic valve 66 to close the electromagnetic valve 66, thereby preventing the further flow of liquid from the dispenser apparatus 10. The microprocessor 58 may be programmed with a wide variety of liquid measurements commonly used when preparing mixed drinks, beers and other beverages. Common liquid measurements programmed into the microprocessor 58 may include ¼ oz., ½ oz., and 1½ oz. volumes for mixed drinks, and 10 oz. and 20 oz. volumes for dispensing beers and other beverages.

Figure 6:
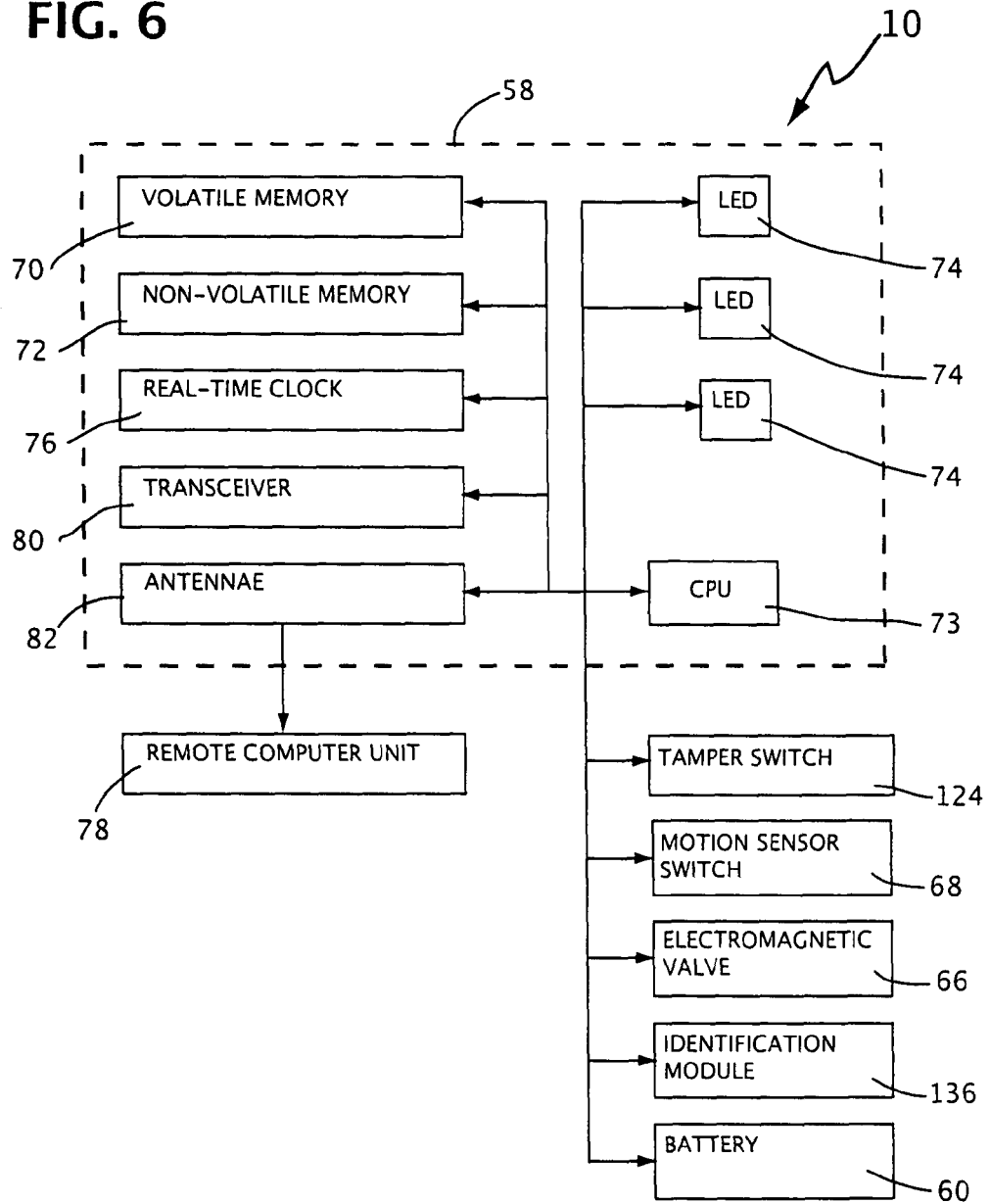
FIG. 6 is a partial cross-sectional view of an outlet conduit of the dispenser apparatus of FIG. 1 showing an electromagnetic valve in a closed position.

As shown in FIG. 6, the microprocessor 58 may consist of both a volatile memory 70, such as flash memory and/or random access memory (RAM), a non-volatile memory 72, such as magnetic random access memory (MRAM), erasable programmable read-only memory (EPROM), and/or electronically erasable programmable read-only memory (EEPROM), and a central processing unit (CPU) 73. The microprocessor 58 is adaptable to contain computer program instructions for measuring, controlling and monitoring the dispensing of liquids from the bottle 12 and dispenser apparatus 10 combination. The microprocessor 58 may also be adaptable for generating visual displays through one or more light emitting diodes 74 to indicate the status of the dispenser apparatus 10, such as, for example, red and green light emitting diodes for indicating that the electromagnetic valve 66 is in a closed position and an open position, respectively. As will be discussed in greater detail below, the one or more light emitting diodes 74 may also be adaptable for providing a visual indication to a bartender or other user of the dispensing sequence for mixing beverages consisting of two or more liquids. The microprocessor 58 may also be programmed to generate a lighting display using the one or more light emitting diodes when the one or more dispenser apparatuses 10 are not in use. The lighting display may consist of one or more of the plurality of light emitting diodes 74 activating, deactivating, intensifying, pulsating, oscillating, flashing, fading or changing colour randomly or in accordance with pre-determined time intervals.

The microprocessor 58 may also be provided with a real-time clock 76 for monitoring time and activating or otherwise interrupting the microprocessor 58 when a scheduled action is required, such as, for example, communicating the status of the bottle 12 and dispenser apparatus 10 combination to a remote computer unit 78. The microprocessor 58 receives the one or more flow signals and any other signals from the flow sensor 56, electromagnetic valve 66 and/or motion sensor switch 68 and transforms this information into a form suitable for wireless communication via a transceiver 80 and an antenna 82, and communicates the transformed information to the remote computer unit 78 through wireless transmissions.

Figure 7:
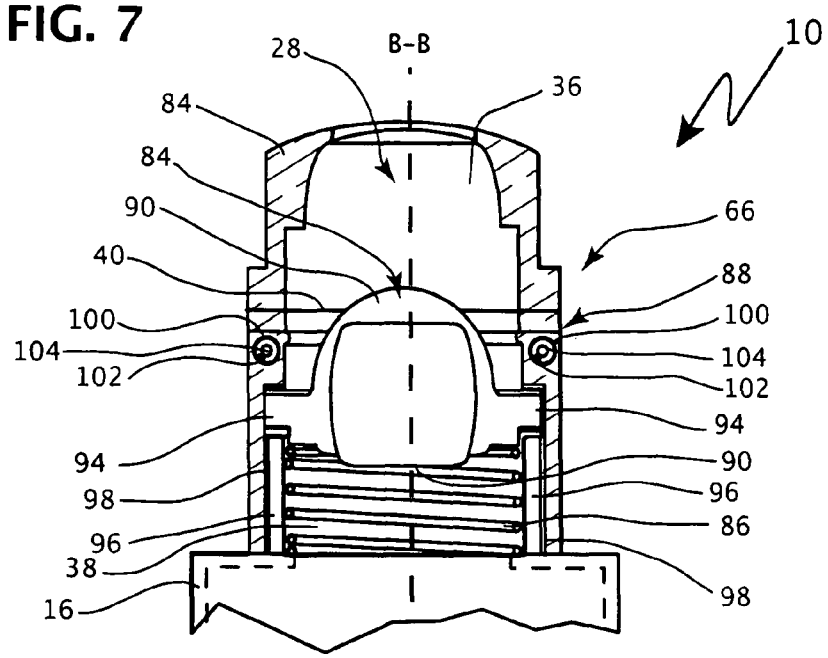
FIG. 7 is an enlarged partial cross-sectional view of the section E-E in FIG. 3 showing the motion sensor switch, in a first position, within the dispenser apparatus of FIG. 1 for forming an electrical connection.
Figure 8:
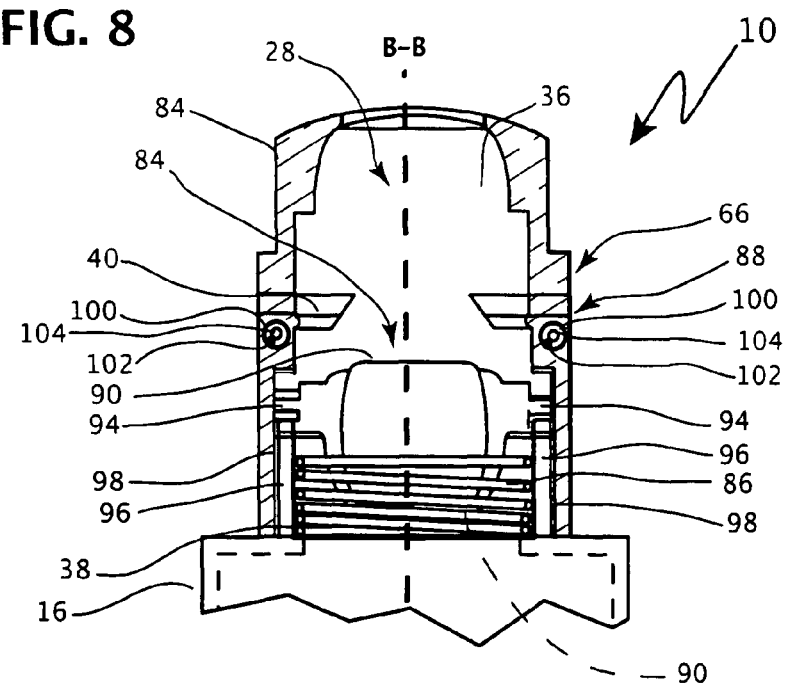
FIG. 8 is a view corresponding to FIG. 7 showing the switch in a second position.

Referring to FIGS. 7 and 8, the electromagnetic valve 66 is positioned proximate to the outlet conduit 32. The electromagnetic valve 66 includes a valve member 84 positioned inside the lower chamber 36 of the outlet conduit 32, a spring member 86 biased against the valve member 84 in the lower chamber 36, and an actuation unit 88 positioned outside of the outlet conduit 32 for actuating the valve member 84 between the closed position and the open position. The actuation unit 88 is operatively connected to the microprocessor 58 for receiving the control signal communicated from the microprocessor 58. The control signal provides instructions from the microprocessor 58 for actuating the actuation unit 88 between a closed position and an open position. Power for actuating the actuation unit 88 between the closed position and the open position is supplied by the battery 60.

The valve member 84 is formed generally in the shape of a truncated sphere and has a sealing surface 90 and a flow surface 92. At least a portion of the valve member 84 is manufactured from a magnetically responsive material, such as, for example, a solid state magnet. The sealing surface 90 is formed with a pair of pivot shafts 94 opposite each other on the sealing surface 90. Each of the pair of pivot shafts 94 are slidably received within a channel member 96 formed within and along a side wall 98 of the lower chamber 36 of the outlet conduit 32. In the closed position, the spring member 86 urges the valve member 84 towards the valve seat 40 so that the sealing surface 90 of the valve member 84 abuts against the valve seat 40 and into a sealing relationship. In the open position, the valve member 84 is rotatably displaced about the pair of pivot shafts 94 so that the flow surface 92 is positioned proximate to, but spaced apart from, the valve seat 40. The valve member 84 is at least slightly urged away from the valve seat 40 by the magnetic force of the actuation unit 88, thereby permitting the flow of liquid around the valve member 84, over the flow surface 92, and through the valve seat 40 into the upper chamber 38 of the outlet conduit 32.

Referring to FIGS. 7 and 8, the actuation unit 88 has a magnetic member 100 and a coil of electrically conductive material 102 wound around the magnetic member 100. The magnetic member 100 is positioned outside of the outlet conduit 32 and is formed with one or more poles 104 adapted to impose a magnetic force on the magnetically responsive material within the valve member 84 to move the valve member 84 between the closed and open positions within the outlet conduit 32. The coil of electrically conductive material 102 is adapted to become energized and thereby change the polarity of the magnetic member 100 in response to the control signal communicated by the microprocessor 58 to the actuation unit 88. When the coil of electrically conductive material 102 becomes energized, the magnetic force imposed by the magnetic member 100 upon the valve member 84 is sufficient to rotatably displace the valve member 84 from the closed position to the open position (shown in FIG. 8). When the coil of electrically conductive material 102 becomes de-energized, the polarity of the magnetic member 100 is returned to its normal or quiescent position and the valve member 84 is rotatably displaced from the open position to the closed position within the lower chamber 36 of the outlet conduit 32 (shown in FIG. 7).

Figure 9:
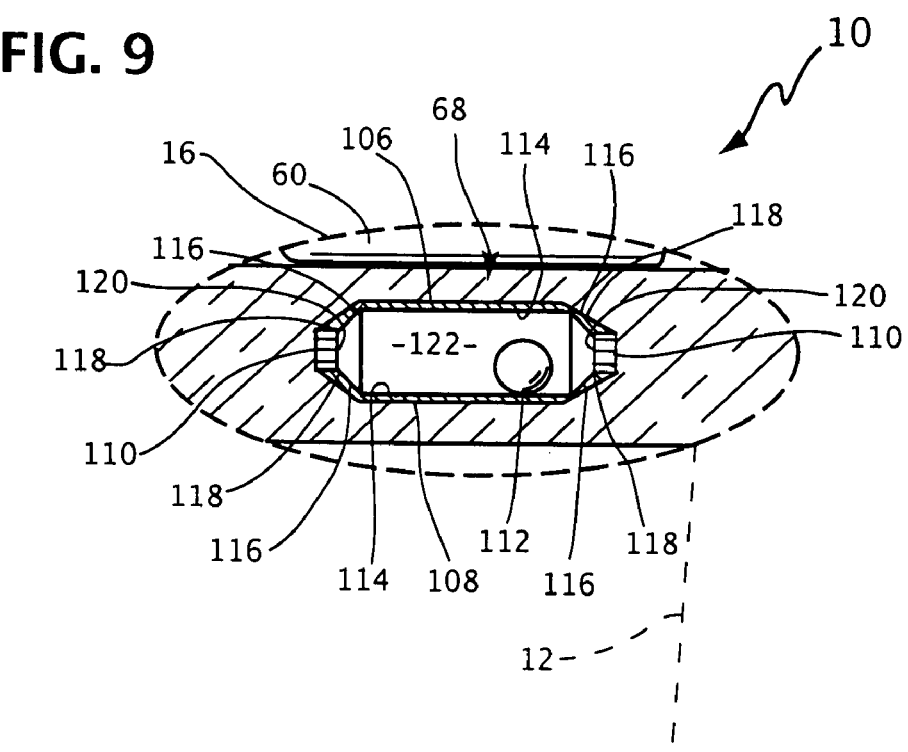
FIG. 9 is an enlarged partial cross-sectional view of the Section E-E in FIG. 3 showing the motion sensor switch within the dispenser apparatus of FIG. 1
Figure 10:
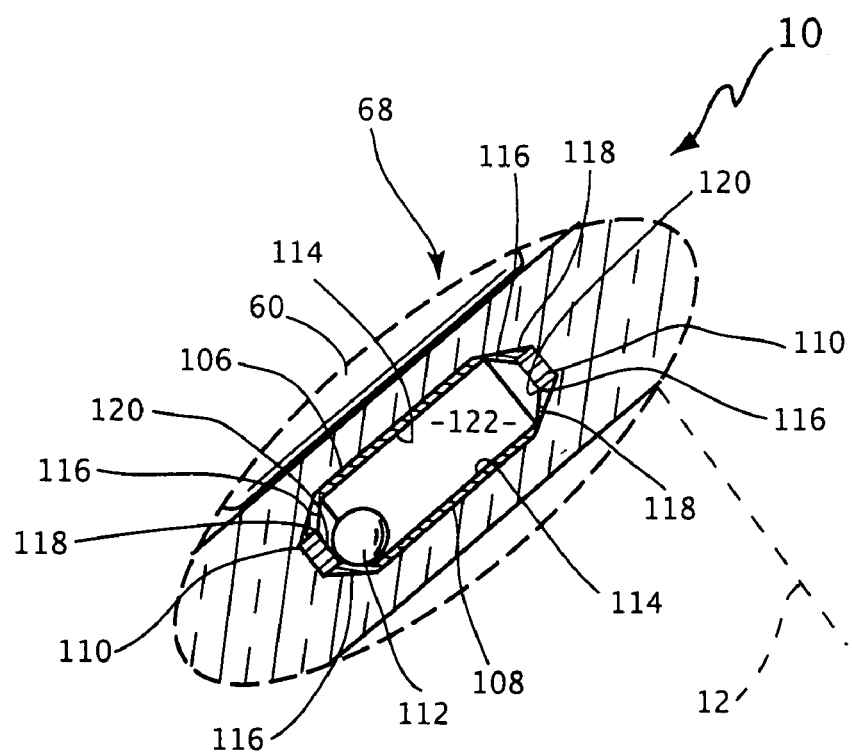
FIG. 10 is an enlarged partial cross-sectional view of the Section E-E in FIG. 3 showing the motion sensor switch within the dispenser apparatus of FIG. 1 for forming an electrical connection.
Figure 11:
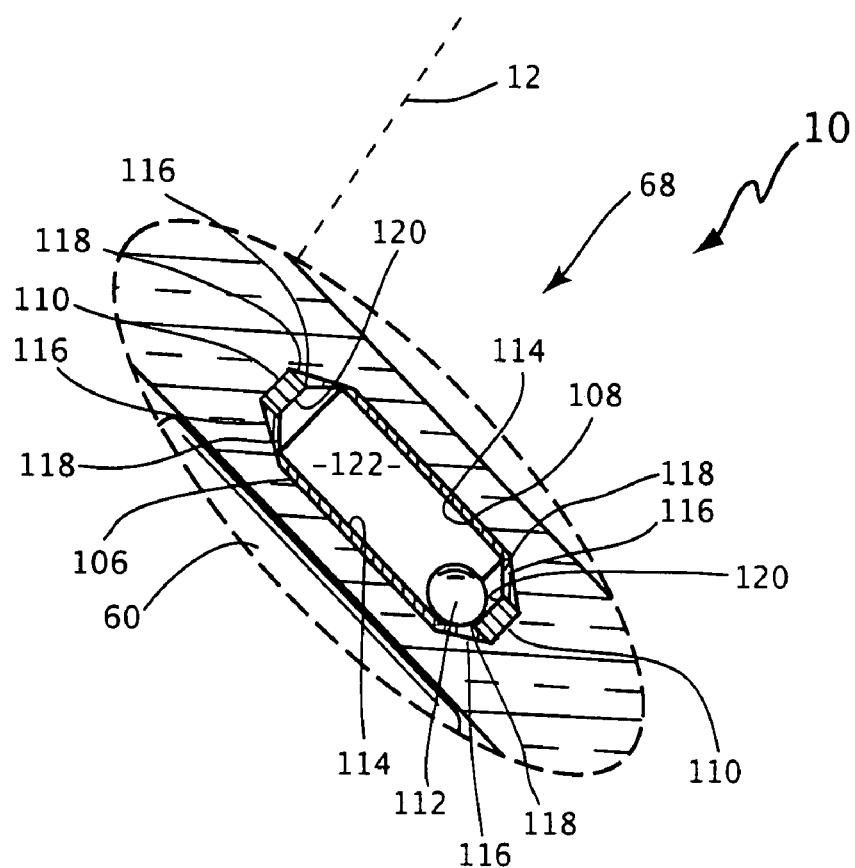
FIG. 11 is an enlarged partial cross-sectional view of the Section E-E in FIG. 3 showing the motion sensor switch within the dispenser apparatus of FIG. 1 for forming an electrical connection.

Reference is now made to FIGS. 9, 10 and 11 which illustrate an enlarged partial cross-sectional view of Section E-E in FIG. 3. Referring to FIG. 9, the motion sensor switch 68 is positioned within the nozzle portion 16 adjacent to the cavity 34 for detecting movement of the bottle 12 and dispenser apparatus 10 combination. The motion sensor switch 68 has a first contact plate 106, a second contact plate 108 vertically spaced apart from the first contact plate 106, a contact ring 110 disposed between the first and second contact plates 106 and 108, and a ball bearing 112. Each of the contact plates 106 and 108 has a flat base surface 114 and a sloping side surface 116 extending to a circumferential wall 118. The contact ring 110 extends vertically between the circumferential walls 118 of the first and second contact plates 106 and 108 and is formed with an inner circumferential wall 120. The first and second contact plates 106 and 108 and the contact ring 110 form an interior chamber 122 dimensioned to receive the ball bearing 112. The ball bearing 112 is movable along the base surface 114 and sloping side surface 116 of the first and second contact plates 106 and 108 in response to the movement of the bottle 12 and/or the dispenser apparatus 10. The sloping side surfaces 116, contact ring 110 and ball bearing 112 are manufactured from an electrically conductive material. When the bottle 12 and dispenser apparatus 10 combination are disposed in an upright position, gravity will cause the ball bearing 112 to rest along the base surface 114 of the second contact plate 108. As the bottle 12 and dispenser apparatus 10 combination is gradually inverted, gravity causes the ball bearing 112 to move along the base surface 114 and the sloping side surface 116 of the second contact plate 108 (as shown in FIG. 10). When the bottle 12 and dispenser apparatus 10 combination has been partially inverted, gravity will cause the ball bearing 112 to move and abut against the sloping side surface 116 of the second contact plate 108 and the contact ring 110 simultaneously, thereby forming an electrical connection between the second contact plate 108 and the contact ring 110. If the bottle 12 and dispenser apparatus 10 combination is substantially inverted, gravity will cause the ball bearing 112 to move against the sloping side surface 116 of the first contact plate 106 and the contact ring 110 simultaneously, thereby forming an electrical connection between the first contact plate 106 and the contact ring 110 (as shown in FIG. 11). Upon the formation of the electrical connection between the ball bearing 112, the contact ring 110 and the first or second contact plate 108, power is supplied from the battery 60 to the motion sensor switch 68 and an acutation signal is communicated from the motion sensor switch 68 to the microprocessor 58 to indicate that a user is attempting to dispense liquid from the bottle 12.

The motion sensor switch 68 functions as an on-off switch for the dispenser apparatus 10 to prevent the battery 60 from becoming unnecessarily discharged when the dispenser apparatus 10 is not in use. It should be understood by a person skilled in the field of the present invention that any suitable battery 60 may be used to provide power to the components of the dispenser apparatus 10. In order to extend the usable life of the battery 60, all components of the dispenser apparatus 10 have been selected for minimum power consumption. The provision of a motion sensor switch 68 enables the microprocessor 58 to turn off when the bottle 12 and dispenser apparatus 10 combination is not in use. When the bottle 12 and dispenser apparatus 10 combination is gradually inverted, an electrical connection will be formed within the motion sensor switch 68, thereby enabling the supply of power from the battery 60 to the motion sensor switch 68 and the communication of the actuation signal to the microprocessor 58 to turn the microprocessor 58 on.

It should be understood that the dimensions of the first and second contact plates 106 and 108 may be adjusted to increase or decrease the sensitivity of the motion sensor switch 68. In particular, the angle of inclination of the sloping side surface 116 on each of the first and second contact plates 106 and 108 may be increased to produce a less sensitive motion sensor switch 68. Alternatively, the angle of inclination of the sloping side surface 116 may be decreased to produce a more sensitive motion sensor switch. In alternative embodiments, it should be understood that the motion sensor switch 68 may take the form of any suitable motion sensor or tilt switch as known by persons skilled in the field of the present invention.

Figure 12:
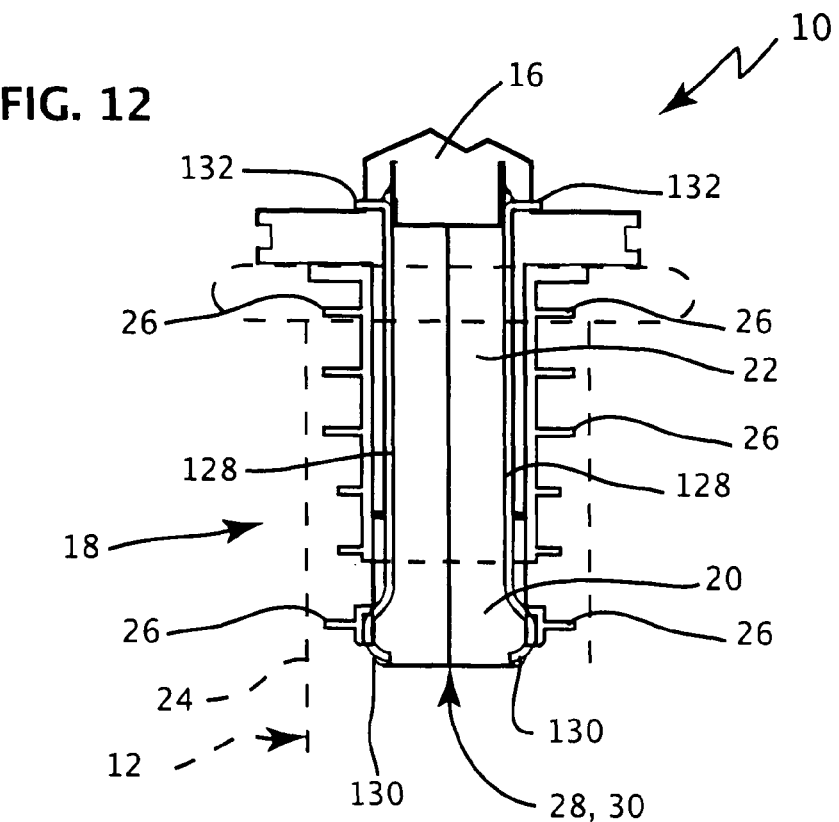
FIG. 12 is a partial cross-sectional view of a tamper switch within a base portion of the dispenser apparatus of FIG. 1.
Figure 13:
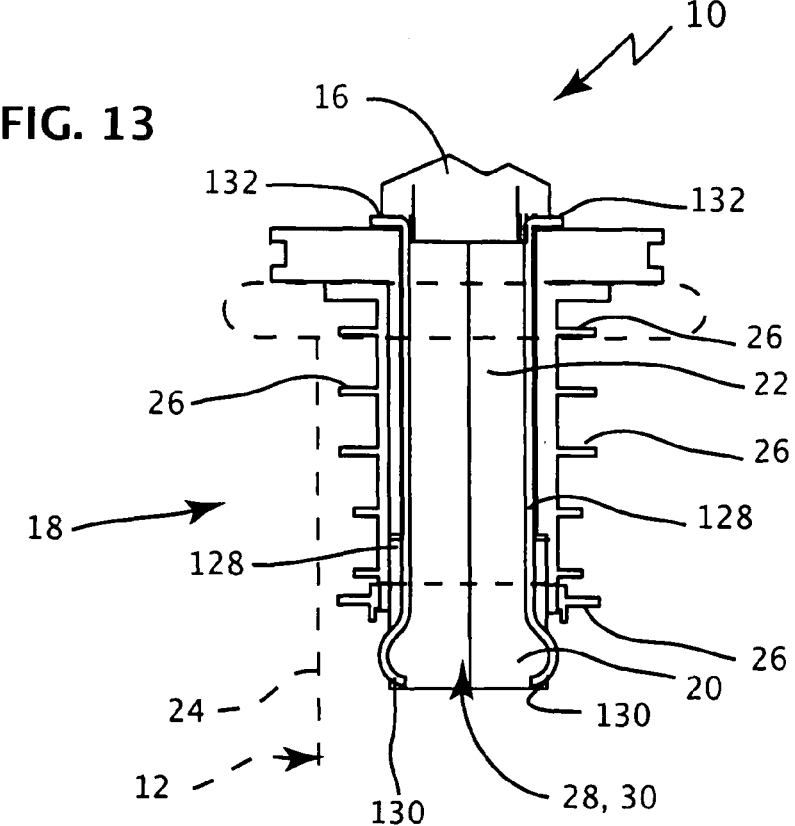
FIG. 13 is partial cross-sectional view of a tamper switch within a base portion of the dispenser apparatus of FIG. 1.

Referring to FIGS. 12 and 13, the upper and lower inlet chambers 20 and 22 of the base portion 18 are formed with a tamper switch 124. The tamper switch 124 is operatively connected to the microprocessor 58 and battery 60 (not shown) and is programmed for communicating a tamper signal if the dispenser apparatus 10 is removed from or tampered with within the neck portion 24 of the bottle 12. The tamper switch 124 includes a cylindrical ring electrode 126 mounted within the lower inlet chamber 22 of the base portion 18 and a conducting wire 128 mounted within the inlet conduit 30 portion of the upper inlet chamber 20. A lower end 130 of the conducting wire 128 extends downwardly from the upper inlet chamber 20. A top end 132 of the conducting wire 128 extends upwardly from the base portion 18 into the nozzle portion 16. The cylindrical ring electrode 126 and the conducting wire 128 comprise a switch in an electrical circuit. To close the switch, the lower inlet chamber 22 of the base portion 18 is slidably positioned upwardly in relation to the upper inlet chamber 20, as shown in FIG. 13, thereby bringing the cylindrical ring electrode 126 into electrical contact with the lower end 130 of the conducting wire 128. The lower end 132 of the conducting wire 128 comes into contact with an inner edge 134 of the cylindrical ring electrode 126. In use, the closing of the switch occurs as the dispenser apparatus 10 is received downwardly in the neck portion 24 of the bottle 12. The friction between the seals 26 on the base portion 18 and the neck portion 24 of the bottle 12 causes the base portion 18 to slide into the closed switch position.

The electrical circuit between the cylindrical ring electrode 126 and the conducting wire 128 may be broken by simply pulling the dispenser apparatus 10 from the neck portion 24 of the bottle 12. The friction between the seals 26 on the base portion 18 and the neck portion 24 of the bottle 12 causes the nozzle portion 16 and the upper inlet chamber 20 to partially slide away from the lower inlet chamber 22 (as shown in FIG. 12). When the upper inlet chamber 20 partially slides or pulls away from the lower inlet chamber 22, the electrical circuit there between is broken. When the electrical circuit is broken, a tamper signal is communicated from the microprocessor 58 to the remote computer unit 78. Personnel at the entertainment venue may investigate the tamper signal to determine whether an individual is attempting to dispense liquids from the bottle 12 in an unauthorized manner.

The electrical circuit between the cylindrical ring electrode 126 and the conducting wire 128 may also be broken if an individual attempts to force an object, such as a knife, for example, between the neck portion 24 of the bottle 12 and the seals 26 on the base portion 18 of the dispenser apparatus 10. In this manner, the individual is attempting to lift or deform the seals 26 to enable the flow of liquid around the dispenser apparatus 10. The downward force of the knife within the confines of the neck portion 24 will cause the lower inlet chamber 22 of the base portion 18 to slide away from the upper inlet chamber 20, thereby breaking the electrical circuit and triggering the communication of the tamper signal by the microprocessor 58.

Figure 14:
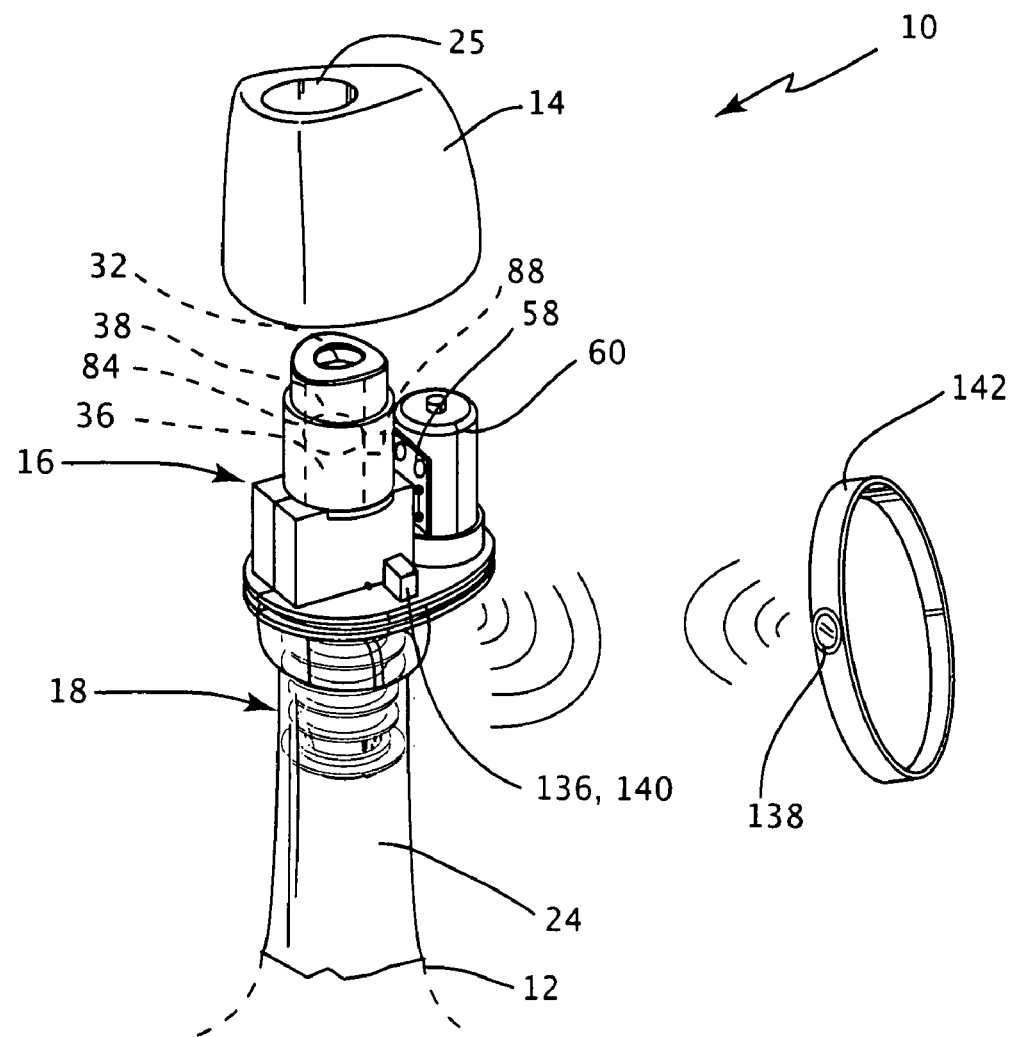
FIG. 14 is a partial cross-sectional view of an identification module within the dispenser apparatus of FIG. 1 for communicating with a transponder.

Referring to FIG. 14, a second embodiment of the dispenser apparatus 10 is shown having an identification module 136 provided within the nozzle portion 16 of the housing 14. The identification module 136 is operatively connected to the microprocessor 58, the antennae 92 and the battery 60 for communicating with a transponder 138 provided to individuals within the entertainment venue. Individuals provided with the transponders 138 may include, for example, bartenders, hosts, waiters, venue owners and/or patrons. The identification module 136 includes a reader module 140 adapted to communicate via radio frequency with the transponder 138 to determine the identity of individuals dispensing liquid from the one or more of the bottle 12 and dispenser apparatus 10 combinations throughout the entertainment venue. As shown in FIG. 14, the transponder 138 may be contained in a bracelet 142 that is worn by an individual while they are situated within the entertainment venue or at the time of dispensing liquids from one or more of the bottle 12 and dispenser apparatus 10 combinations. When the wearer of the bracelet 142 is an employee or owner of the entertainment venue, the transponder 138 may be adapted to store information for identifying the employee or owner, such as, for example, the wearer's employee number and name. By this design, the venue owner will be able to monitor the dispensing activities of their employees, thereby minimizing the likelihood of unauthorized dispensing. When the wearer of the bracelet 142 is a patron of the entertainment venue, the transponder 138 may be adapted to store their name, payment information, and the identity of the one or more bottle 12 and dispenser apparatus 10 combinations from which they are permitted to dispense liquids. The payment information may include the particulars of the individual's credit card or a pre-paid monetary amount that is debited by the entertainment venue following each dispensing activity. By this design, the patron may dispense liquids freely from one or more of the dispenser apparatus 10 combinations within a VIP or party room within the entertainment venue, for example, without the assistance of a bartender or waiter. All dispensing activities by the individual will be automatically added to his or her bill according to the payment information stored in his or her transponder 138. The reader module 140 utilizes radio frequency technology to communicate with the transponder 138 when an individual is proximate to a bottle 12 and dispenser apparatus 10 combination. For example, when the individual grasps the bottle 12 and dispenser apparatus 10 combination in his or her hand, the reader module 140 of the identification module 136 is programmed to receive information stored in the individual's transponder 138 and to determine via the microprocessor 58 and/or the remote computer unit 78 if said individual is permitted to dispense the liquid from the bottle 12 and dispenser apparatus 10 combination. If permission has been granted to said individual, the microprocessor 58 will communicate an actuation signal to the actuation unit 88 and the valve member 84 will be moved into the open position to permit dispensing. The volume of liquid dispensed from the bottle 12 and dispenser apparatus 10 combination will be measured and communicated by the microprocessor 58 and flow sensor 56 to the remote computer unit 78. The volume of liquid dispensed will then be charged to said individual's bill, if they are a patron of the entertainment venue, or to the employee's record, if they are a bartender, host, or waiter at the entertainment venue, for example. If the individual is not permitted to dispense the liquid, the valve member 84 will remain in the closed position and the microprocessor 58 may be adapted to communicate a control signal to remote computer unit 78. The control signal may indicated to the venue owner that the individual must replenish his or her pre-paid monetary amount before dispensing will be permitted, for example.

Figure 15:
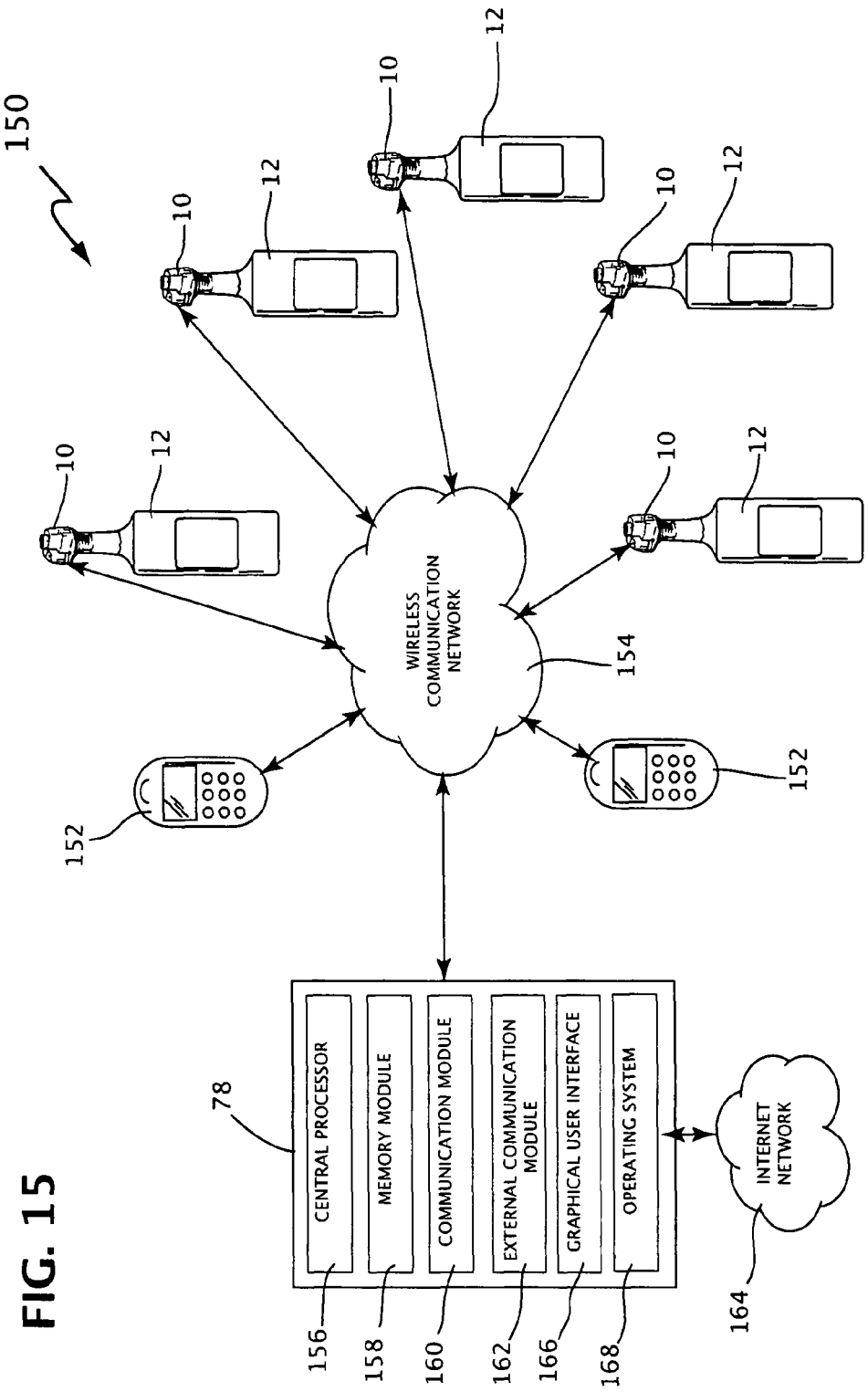
FIG. 15 is a schematic diagram illustrating a dispenser system for dispensing liquids from a plurality of dispenser apparatus in an entertainment venue made in accordance with an embodiment of the present invention.

Reference will now be made to FIG. 15 which illustrates a dispenser system 150 comprising of a plurality of dispenser apparatuses 10 in accordance with a preferred embodiment of the present invention. The dispenser system 150 includes the one or more dispenser apparatuses 10 which are coupled to liquid containing bottles 12 throughout an entertainment venue, one or more input devices 152 for receiving beverage orders from bartenders, patrons and/or users, and a remote computer unit 78 which is adapted to communicate with each of the dispenser apparatuses 10 and input devices 152 via a two-way wireless communication network 154. It should be understood that any suitable two-way wireless communication network 154 may be utilized with the dispenser system 150 of the present invention, such as, for example, a personal communication service (PCS) network, a satellite-based network or a radio frequency-based network.

The one or more input devices 152 may include a touch panel display screen or portable digital assistant capable of receiving and communicating one or more beverage orders from a bartender, waiter or patron within the entertainment venue to the remote computer unit 78 via the wireless communication network 154. In addition to being used at entertainment venues, it should be understood by persons skilled in the art of the invention that the dispenser system 150 may be utilized at any suitable venue or other business to control, measure, and monitor the dispensing of liquids from bottles 12. Such venues or businesses may include bars, restaurants, night clubs, and laboratories, for example.

Referring to FIG. 15, the remote computer unit 78 is situated remotely from the display apparatuses 10 and input devices 152. The remote computer unit 78 includes a central processor 156, a memory module 158, and a communication module 160 programmed for receiving the one or more beverage order signals from the input devices 152. The dispenser system 150 may further comprise an external communication module 162 to enable the remote computer unit 78 to communicate with an Internet network 164 to receive programming updates. The recipe and dispensing sequence instructions for each of a plurality of beverages are stored in the memory module 158. Upon receiving the one or more beverage order signals, the remote computer unit 78 retrieves the recipe and dispensing sequence instructions from the memory module 158 corresponding to the one or more ordered beverages. The instructions are transformed into a form suitable for wireless communication from the central processor 156 to the communication module 160. The recipe and dispensing sequence instructions are then communicated to the dispenser apparatuses 10 as one or more control signals to enable the fulfillment of the one or more beverage orders by the bartender, waiter or patron. If the recipe and dispensing instructions for a particular beverage are complicated or require the dispensing of liquids from more than one bottle 12, the microprocessor 58 may be programmed to stagger the one or more control signals containing the recipe and dispensing instructions to ensure that the bartender, waiter or patron dispenses and mixes the liquids within the bottles 12 in the correct sequence. Each staggered control signal is also designed to activate the light emitting diodes 74 within the dispenser apparatus 10 corresponding to the next liquid in the dispensing sequence to be dispensed By this design, the activation of the light emitting diodes 74 within the successive dispenser apparatuses 10 instructs the bartender, for example, in the correct sequence for dispensing and mixing the ordered beverage. As the dispenser system 150 is capable of providing the recipes and dispensing sequence instructions for a plurality of beverages, it will no longer be necessary for venue owners to hire knowledgeable bartenders or to spend considerable time, money and effort training new bartenders in the field of beverage recipes. In addition to controlling the volume of liquids dispensed from the bottle 12 and dispenser apparatus 10 combinations in entertainment venues, the dispenser system 150 is also advantageous because it faciliates the uniform dispensing and mixing of beverages. An owner of a chain of entertainment venues would be able to ensure that the beverages dispensed and mixed for patrons at each of the entertainment venues are substantially identical.

The remote computer unit 78 may include an interface 166, such as a graphical user interface, and an operating system (OS) 168 that reside within machine readable media to control the operation of the dispenser system 150. The interface 166 may be utilized by a venue owner to obtain real-time business information and to monitor the dispensing of the liquids from the bottle 12 and dispenser apparatus 10 combinations throughout the entertainment venue. By this design, the venue owner will be able to closely, yet remotely, monitor the activities of the employees and patrons to minimize the occurrence of unauthorized dispensing of liquids. The interface 166 will also provide the venue owner with real-time inventory information to facilite the replenishment of the supply of bottles 12 when necessary. When the volume of liquid remaining in one or more of the plurality of bottles 12 reaches a predetermined volume, such as, for example, a minimum volume, the remote computer unit may be programmed to communicate an order signal for the replenishment of the subject one or more bottles. The order signal may be communicated to an employee of the entertainment venue if replacement bottles are available on-site or to a remote supplier if it is necessary to order a new supply of the subject bottles.

In use, dispenser apparatuses 10 of the present invention may be positioned within the neck portion 24 of bottles 12 throughout an entertainment venue from which the dispensing of liquids is to be measured and monitored. An employee or patron may input one or more beverage orders into input devices 152 provided throughout the entertainment venue. When a bottle 12 and dispenser apparatus 10 combination corresponding to the one or more beverage orders is inverted or otherwise agitated by an employee or patron ordering the beverage, power is supplied from the battery 60 to the motion sensor switch 68 and an actuation signal is communicated from the motion sensor switch 68 to the microprocessor 58 to indicate that a user is attempting to dispense liquid from the bottle 12. Simultaneously, the identification module 136 communicates with the transponder 138 belonging to the employee or patron to determine whether they are authorized to dispense liquid from the subject bottle 12. If the employee or patron is authorized, the microprocessor 58 communicates a control signal to actuation unit 88 to open the electromagnetic valve 66. Using the information communicated from the flow sensor 56, the microprocessor 58 measures the volume of liquid being dispensed from the dispenser apparatus 10 in real time and communicates a further control signal to the actuation unit 88 to close the electromagnetic valve 66 when the dispensed volume of liquid equals the volume of liquid ordered by the employee or patron. In the event that an employee or patron attempts to remove the dispenser apparatus 10 in an unauthorized manner, the tamper switch 124 will communicate a tamper signal to the remote computer unit 78 to notify the venue owner. When the volume of liquid remaining in a particular bottle 12 and dispenser apparatus 10 combination is low, the remote computer unit 78 may be adapted to notify the venue owner to facilitate the replacement or replenishment of the bottle 12.

It is anticipated that the dispenser apparatus 10 and dispenser system 150 of the present invention will allow venue owners to closely monitor the measuring and dispensing of liquids within an entertainment venue. More particularly, the adoption of the dispenser apparatus 10 and dispenser system 150 will have the likely effect of increasing the profitability of an entertainment venue by minimizing the financial losses from the unauthorized dispensing of liquids by employees and/or patrons and by limiting the cost expenditures required to train new employees in the art of bartending. The dispenser apparatus 10 and dispenser system 150 of the present invention is also designed to enhance the enjoyment of the entertainment venue by patrons by providing mixed beverages having a more consistent taste. Moreover, the provision of bottles 12 containing the dispenser apparatuses 10 and transponders 128 will enable patrons in VIP and party room environments to dispense their own beverages without the assistance of bartenders or waiters, for example.

While the use of the dispenser apparatus 10 and the dispenser system 150 has been described herein in the context of dispensing beverages at an entertainment venue, it should be understood by a person skilled in the art that the present invention may be utilized in a wide variety of venues and industries. For example, the dispenser apparatus 10 and the dispenser system 150 may be utilized in the pharmaceutical industry for measuring and monitoring the controlled dispensing of liquids for prescriptions. In the chemical industry, the dispenser apparatus 10 and the dispenser system 150 could be used to dispense liquid chemicals and dyes from bottle and other containers during the manufacturing and measuring process. Accordingly, it is contemplated that the dispenser apparatus 10 and the dispenser system 150 of the present invention may be used to provide business owners with the ability to measure and monitor the controlled dispensing of liquids from bottles.

While what has been shown and described herein constitutes a preferred embodiment of the subject invention, it should be understood that various modifications and adaptions of such embodiment can be made without departing from the present invention, the scope of which is defined in the appended claims.

The invention claimed is:

1. A dispenser apparatus for dispensing a liquid from a bottle having a neck portion, the dispenser apparatus comprising:

a housing formed with a flow conduit there through in fluid communication with the liquid within the bottle, the flow conduit having an inlet conduit, an outlet conduit and a substantially cylindrical cavity positioned between the inlet conduit and the outlet conduit;

a flow wheel positioned in the cavity, the flow wheel having a central axis and a plurality of blade elements extending outwardly relative to the central axis;

a flow sensor positioned adjacent to the flow wheel and the cavity for detecting movement of the plurality of blade elements of flow wheel;

an electromagnetic valve positioned proximate to the outlet conduit, the electromagnetic valve having an actuation unit outside of the outlet conduit, a valve member inside the outlet conduit, and a spring member biased against the valve member within the outlet conduit, the valve member rotatable between a closed position and an open position upon the actuation of the actuation unit;

a microprocessor operatively connected to the flow sensor, the microprocessor programmed for actuating the actuation unit between the closed position and the open position and for measuring the volume of liquid flowing through the flow conduit via the flow wheel;

a motion sensor switch operatively connected to the microprocessor for forming an electrical connection with a battery and supplying power to the microprocessor for forming an electrical connecton with a battery and supplying power to the microprocessor upon the detection of movement of the bottle, wherein the motion sensor switch is positioned within the nozzle portion for detecting movement of the bottle, the motion sensor switch having a first contact plate, a second contact plate vertically spaced apart from the first contact plate, a contact ring disposed between the first contact plate and the second contact plate, and a ball bearing.

2. A dispenser apparatus as claimed in claim 1, wherein an electrical connection is formed by the abutment of the ball bearing against at least a portion of the first contact plate and the contact ring.

3. A dispenser apparatus as claimed in claim 1, wherein an electrical connection is formed by the abutment of the ball bearing against at least a portion of the second contact plate and the contact ring.

4. A dispenser apparatus as claimed in claim 1, wherein the housing has a base portion formed with an upper inlet chamber and a lower inlet chamber slidably coupled to the upper inlet chamber, each of the upper inlet chamber and the lower inlet chamber formed with one or more seals extending generally perpendicularly therefrom.

5. A dispenser apparatus as claimed in claim 4, wherein the upper inlet chamber and the lower inlet chamber are formed with a tamper switch, the tamper switch is operatively connected to the microprocessor and has a cylindrical ring electrode mounted within the lower inlet chamber and a conducting wire mounted within the upper inlet chamber, the cylindrical ring electrode and the conducting wire forming an electrical circuit.

6. A dispenser apparatus as claimed in claim 5, wherein the tamper switch forms a closed electrical circuit when the lower inlet chamber is slidably positioned upwardly in relation to the upper inlet chamber within the neck portion of the bottle to bring the cylindrical ring electrode into electrical contact with the conducting wire.

7. A dispenser apparatus as claimed in claim 5, wherein the tamper switch forms an open electrical circuit when the base portion is at least partially removed from the neck portion of the bottle, and the cylindrical ring electrode is pulled apart from the conducting wire.

8. A dispenser apparatus as claimed in claim 7 wherein the tamper switch communicates a tamper signal to the microprocessor when an open electrical circuit is formed between the cylindrical ring electrode and the conducting wire.

9. A dispenser apparatus as claimed in claim 1, wherein the outlet conduit has a lower outlet chamber, an upper outlet chamber in fluid communication with the lower outlet chamber, and a valve seat positioned in the lower outlet chamber and the upper outlet chamber, the valve member is urged by the spring member against the valve seat in the closed position, and the valve member is spaced apart from the valve seat in the open position.

10. A dispenser apparatus as claimed in claim 1, wherein the rotatable movement of the valve member between the closed position and the open position prevents the flow of the liquid from the bottle through the conduit and the electromagnetic valve.

11. A dispenser apparatus as claimed in claim 1, wherein in the closed position, the liquid is prevented from flowing from the bottle through the upper conduit by the electromagnetic valve.

12. A dispenser apparatus as claimed in claim 1, wherein in the open position the liquid is permitted to flow from the bottle through the upper conduit and the electromagnetic valve.

13. A dispenser apparatus as claimed in claim 1, wherein the actuation unit having a magnetic member and a coil of electrically conductive material wound around the magnetic member, the coil of electrically conductive material adapted for changing the polarity of the magnetic member when energized and de-energized by the actuation unit.

14. A dispenser apparatus as claimed in claim 13, wherein the magnetic member having one or more poles adapted to impose a magnetic force on the valve member when energized by the actuation unit, the magnetic force imposed being sufficient to rotate the valve member from the closed position to the open position.

15. A dispenser apparatus as claimed in claim 13, wherein the valve member is normally positioned in the closed position when the coil of electrically conductive material is de-energized.

16. A dispenser apparatus as claimed in claim 1, further comprising a battery operatively connected to the actuation unit for supplying current to energize and de-energize the valve member between the closed position and the open position.

17. A dispenser apparatus as claimed in claim 1, wherein the flow of the liquid from the bottle through the inlet conduit and into the cavity engages one or more of the plurality of blade elements on the flow wheel.

18. A dispenser apparatus as claimed in claim 1, wherein the flow sensors emitting a light beam to intersect the rotational path of the plurality of blade elements, the flow sensor having a light transmitter for emitting the light beam and a light receiver juxtaposed to the light transmitter for detecting the light beam from the light transmitter.

19. A dispenser system for dispensing a liquid from a plurality of bottles, each of the bottles having a neck portion, the dispenser system comprising:

a plurality of dispensers each of the plurality of dispensers having a housing formed with a flow conduit therethrough in fluid communication with the liquid within the bottle, the flow conduit having an inlet conduit, an outlet conduit and a substantially cylindrical cavity positioned between the inlet conduit and the outlet conduit;

a flow wheel positioned in the cavity, the flow wheel having a central axis and a plurality of blade elements extending outwardly relative to the central axis;

a flow sensor positioned adjacent to the flow wheel and the cavity for detecting movement of the plurality of blade elements of flow wheel;

an electromagnetic valve positioned proximate to the outlet conduit, the electromagnetic valve having an actuation unit outside of the outlet conduit, a valve member inside the outlet conduit, and a spring member biased against the valve member within the outlet conduit, the valve member rotatable between a closed position and an open position upon the actuation of the actuation unit;

a microprocessor operatively connected to the flow sensor, the microprocessor programmed for actuating unit between the closed position and the open position and for measuring the volume of liquid flowing through the flow conduit via the flow wheel;

a motion sensor switch operatively connected to the microprocessor for forming an electrical connection with a battery and supplying power to the microprocessor for forming an electrical connection with a battery and supplying power to the microprocessor upon the detection of movement of the bottle, wherein the motion sensor switch is positioned within the nozzle portion for detecting movement of the bottle, the motion sensor switch having a first contact plate, a second contact plate vertically spaced apart from the first contact plate, a contact ring disposed between the first contact plate and the second contact plate, and a ball bearing; and a remote computer unit for communicating a control signal to each of the plurality of dispenser apparatuses, the control signal controlling the volume of liquid to be dispensed from one or more of the plurality of bottles.

20. The dispenser system as claimed in claim 19, further comprising one or more input devices for receiving and communicating beverage orders to the remote computer unit via a wireless communication network.

21. The dispenser system as claimed in claim 20, wherein the remote computer unit is programmed to communicate one or more recipe and dispensing sequence instructions to one or more dispenser apparatuses upon receiving the beverage orders from the one or more input devices wherein the one or more recipe and dispensing sequence instructions activating one or more light emitting diodes within one or more dispenser apparatuses for identifying the liquids for dispensing and mixing the beverage orders.

22. The dispenser system as claimed in claim 21, wherein the one or more recipe and dispensing sequence instructions identifies the one or more bottles and volumes of liquids to be dispensed and mixed for the beverage orders.

23. The dispenser system as claimed in claim 19, wherein each of the plurality of dispenser apparatuses further comprising a motion sensor switch operatively connected to the microprocessor for forming an electrical connection with a battery and supplying power to the microprocessor upon the detection of movement of the bottle.

24. The dispenser system as claimed in claim 19, wherein each of the plurality of dispenser apparatuses has a base portion formed with an upper inlet chamber and a lower inlet chamber slidably coupled to the upper inlet chamber, each of the upper inlet chamber and the lower inlet chamber formed with one or more seals extending generally perpendicularly therefrom for substantially forming a seal between the base portion and the neck portion.

25. A dispenser system as claimed in claim 24, wherein the upper inlet chamber and the lower inlet chamber of each of the plurality of dispenser apparatuses formed with a tamper switch is operatively connected to the microprocessor and the remote computer unit from communicating a tamper signal.

26. A dispenser system as claimed in claim 25, wherein the tamper switch forms a closed electrical circuit when the lower inlet chamber is slidably positioned upwardly in relation to the upper inlet chamber within the neck portion of the bottle to bring a cylindrical ring electrode within the lower inlet chamber into electrical contact with a conducting wire withing the upper inlet chamber.

27. A dispenser system as claimed in claim 26, wherein the tamper switch forms an open electrical circuit when the base portion is a lease partially removed from the neck portion of the bottle, and the cylindrical ring electrode is pulled apart from the conducting wire.

28. A dispenser system as claimed in claim 27, wherein the tamper switch communicates a tamper signal to the microprocessor and the dispenser system when an open electrical circuit is formed between the cylindrical ring electrode and the conducting wire.

29. The dispenser system as claimed in claim 28, wherein each of the tamper protection switches is programmed to communicate a tamper signal to the microprocessor and the remote computer unit in the event of the unauthorized dispensing of liquid from one or more of the plurality of bottles.

30. The dispenser system as claimed in claim 29, wherein the remote control unit is programmed to terminate the dispensing of liquid from the plurality of bottles upon the communication of a tamper signal.

31. The dispenser system as claimed in claim 30, wherein the remote computer unit is programmed to monitor the volume of liquid dispensed through the plurality of dispenser apparatuses and to communicate an order signal for the replenishment of one or more of the plurality of bottles once the liquid remaining the in plurality of bottles reaches a predetermined volume.

32. The dispenser system as claimed in claim 19, wherein each of the plurality of dispenser apparatuses further comprising of an identification module for communicating with a transponder and the remote computer unit for determining and monitoring the identity of an individual dispensing liquid from the plurality of bottles.

33. The dispenser system as claimed in claim 32, wherein the transponder storing information for enabling the identification and monitoring of the individual by the remote computer unit.

34. The dispenser system as claimed in claim 19, wherein the flow sensors emitting a light beam to intersect the rotational path of the plurality of blade elements, the flow sensor having a light transmitter for emitting the light beam and a light receiver juxtaposed to the light transmitter for detecting the light beam from the light transmitter.

* * * * *